Patented Apr. 7, 1942

2,278,838

UNITED STATES PATENT OFFICE 2,278,838

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, and Bernhard Keiser, Webster Groves, Mo., assignors to Petrolite Corporation, Ltd., Wilmington, Del., a corporation of Delaware No Drawing. Application March 11, 1940, Serial No. 323,418

22 Claims. (Cl. 252—8.55)

This invention relates to the art or procedure commonly referred to as acidization of oil-bearing calcareous strata or the like, and which consists in introducing a strong mineral acid into an oil well for the purpose of causing the acid to disintegrate, dissolve, or re-act with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical or similar treatment, in order to recover the oil or valuable constituent of the emulsion. Our invention has for its main object to prevent the formation of objectionable water-in-oil type emulsions resulting from acidization of oil wells, or stated in another way, one object of our invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory rather than a permanent situation, but even if lasting only for a few weeks, are extremely objectionable.

Another object of our invention is to provide a new composition of matter that is particularly adapted for use in the operation of acidizing the calcareous oil-bearing strata of a well, inasmuch as said composition will re-act with or act upon the calcareous structure in a way to increase the amount of crude petroleum obtainable from said structure, without however, converting said crude petroleum into an objectionable emulsion.

Our new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Said emulsion-preventing agent consists of a glycol or polyglycol ether of the type obtainable by causing an aromatic or hydroaromatic hydroxyl compound substituted in the nucleus by at least one hydrocarbon radical or the equivalent, containing at least four carbon atoms, to react with an alpha beta alkylene oxide, such as ethylene oxide, propylene oxide, butylene oxide, or the like.

In practising our process the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion - preventing agent, preferably in aqueous solution, prior to the introduction of the mineral acid into the well;

(b) Introducing the emulsion - preventing agent along with the mineral acid, i. e., dissolved in said acid; and (c) Introducing the emulsion - preventing agent, preferably in aqueous solution, immediately after the introduction of the mineral acid.

The composition of matter that we have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Bé. acid, as we have found that when such an acid is mixed with approximately 0.01% to 2.5% of the herein contemplated emulsion - preventing agent or agents, one obtains a new composition of matter that is perfectly stable and homogeneous, and which exhibits unusual properties, particularly when said acid mixture or new composition of matter is employed in the acidization of oil-bearing strata. However, we wish it to be understood that our invention, i. e., the new process and composition of matter herein described, is not restricted to the use of hydrochloric acid, but instead, contemplates the use of any suitable "strong mineral acid," several of which have previously been described as being usable in place of hydrochloric acid. Similarly, we wish it to be understood that the new composition of matter herein described may have other or additional uses, such, for example, as in the acidization of oil-bearing strata, which do not produce emulsions. The hydrochloric acid or the like that is employed, may or may not have present other addition agents intended to make the acid particularly adapted to meet localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same, siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art relating to acidization, although there are in addition certain other practical elements which are well known:

U. S. Patent No. 1,877,504, dated Sept. 13, 1932, Grebe and Sanford; U. S. Patent No. 1,891,667, dated Dec. 20, 1932, Carr; U. S. Patent No. 1,911,446, dated May 20, 1933, Grebe and Sanford; U. S. Patent No. 1,990,969, dated Feb. 12, 1935, Wilson; U. S. Patent No. 2,011,579, dated Aug. 20, 1935, Heath and Fry; U. S. Patent No. 2,024,718, dated Dec. 17, 1935, Chamberlain; U. S. Patent No. 2,038,956, dated Apr. 28, 1936, Parkhurst; U. S. Patent No. 2,053,285, dated Sept. 8, 1936, Grebe; U. S. Patent No. 2,128,160, dated Aug. 23, 1938, Morgan; U. S. Patent No. 2,128,161, dated Aug. 23, 1938, Morgan; U. S. Patent No. 2,161,085, dated June 6, 1939, Phalen.

As has been previously stated, in the acidization of oil-bearing calcareous strata or the like, it has been found necessary, in some instances, to add certain other materials or compounds which give additional desirable effects, at least under certain conditions. For instance, hydrofluoric acid or fluorides have been added to intensify the action of the hydrochloric acid used to treat the well. Possibly this is related to the action on siliceous matter in the calcareous structure. The reason for the addition of inhibitors has been previously indicated. Sometimes it has been desirable to add tenacious foam-producing agents, such as glue, gelatin, or the like. In other instances, it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

We have found that the materials or products which we contemplate adding to the hydrochloric acid or the like to produce our new composition of matter, or to act as an emulsion-preventing agent in our new process, do not interfere in any manner with the functional effect of other conventional acidizing addition agets. Of course, any single example may contain no additional agent at all; or it may contain one or more, depending upon the particular local conditions and use. As far as we are aware, the herein-contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit, 0.01% to 2.5%. In many instances, the use of between 0.05% and 0.5% represents an acceptable average range.

In actual practice the hydrochloric acid obtained by a person or firm responsible for acidizing operations, may be used, in some instances, on oil-bearing strata, which do not form severe or refractory emulsions, and thus no advantage is obtained by adding a composition of the kind herein contemplated in comparison with ordinary acid. Then too, some calcareous oil-bearing strata which produces severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that we employ, and without danger of said emulsion-preventing agent interfering with the effectiveness of such other acidization addition products. Likewise, it has been indicated that one need not necessarily employ our emulsion-preventing agent in the form of an addition agent, which is added to or mixed with the acid used in the acidizing step. Instead, our emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably, employs the same apparatus and procedure used for introducing the acid. For convenience, however, and in the most preferred form, our invention is exemplified by employing as an integral part thereof the composition of matter herein contemplated, to wit, hydrochloric acid, or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly equivalent to 20% of calcium chloride and having a pH of 3.5 to 5. Furthermore, if soluble at all they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of our new composition of matter herein described, make it adaptable for uses in other arts with which we are not acquainted; but it may be apparent to others. It is also possible that the stable admixture of the kind described, i. e., certain agents dissolved in strong mineral acid, have other properties which we have not investigated, and in view of such properties, such mixture is particularly adaptable for the particular use herein described.

The substances or materials previously referred to as emulsion-preventing agents, which we employ in our new process and in our new composition of matter, are broadly speaking, well known compounds, but in order that the disclosure of our invention will be complete enough to enable others to practice or make use of our invention, we will give several examples of such emulsion-preventing agents, and will describe in detail how said agents may be obtained or produced. One may employ any of the procedures hereinafter described to obtain glycol or polyglycol ethers from aromatic or hydroaromatic hydroxyl compounds substituted in the nucleus by at least one hydrocarbon or acyl radical containing at least four carbon atoms or the equivalent of such radical, in such a manner that there is introduced into the final compound a glycol or polyglycol ether chain. The carbon atom chain of the hydrocarbon radical or the hydrocarbon radical forming part of the acyl radical, may be interrupted by an oxygen atom; or an oxygen atom may serve to link a nuclear carbon atom to a side chain carbon atom. The substituted hydroxy isocyclic compounds must be water-insoluble prior to the introduction of the ether chain. Emulsion-preventing agents of the kind contemplated by our invention may be obtained by treating or reacting substituted hydroxy alicyclic compounds of the kind described with alkylene oxides of the type which is characterized by the presence of a radical indicated by the following structure:

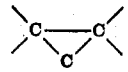

Such compounds may be prepared in such a manner that the alkylene oxide enters the substituted isocyclic hydroxy compound only once, but is preferably prepared in such a manner that it enters several times, preferably at least four times.

In a general way, the products obtained, or at least part of them, may be exemplified by the following constitution:

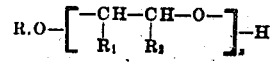

or

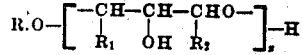

wherein R stands for the aromatic or hydroaromatic radical, which is substituted by at least one hydrocarbon or acyl radical containing at least four carbon atoms, and the radical R may also be further substituted. As previously indicated, the carbon atom chain in either the hydrocarbon radical or the acyl radical may be interrupted by an oxygen atom, or an oxygen atom may serve as a side chain carbon atom-nuclear carbon atom link. $R_1$ and $R_2$ stand for hydrogen or aliphatic radicals which may be substituted by OH or Cl; and X stands for a whole number from 1–100, but usually and preferably from 3 or 4 to 40. Compounds of the second general formula may possibly be formed when an alkylene oxide, such as glycidol, is employed. It is understood that all reference to alkylene oxide or its functional equivalent is intended to mean the type of alkylene oxide commonly referred to as in alpha beta alkylene oxide, i. e., where an oxygen atom represents a linkage between two adjacent carbon atoms, although the oxygen linkage does not necessarily involve a terminal carbon atom; and any functional equivalents are intended to include this same characteristic structure in an equivalent manner.

As will be subsequently pointed out, a wide variety of alkylene oxides may be employed, and also equivalents such as glycidol, epichlorhydrin, various chlorhydrins, etc. Furthermore, it is quite possible that the structure of the polymerized alkylene oxide chain or its equivalent, at least in some instances, is not as simple as is indicated by the above formulas. This is based on the well known properties of polyethylene oxide and related compounds, and particularly polymerization products derived from ethylene oxide under various conditions. Reference is made to Chemistry of Synthetic Resins, by Ellis, 1935, chapter 50, and to U. S. Patent No. 1,921,378, dated August 8, 1933, to Webel, and U. S. Patent No. 1,976,628, dated October 9, 1934, to Wittwer. For this reason the previous structural formulas are submitted primarily to show the point of introduction of the polymerized ether radical or its equivalent, rather than the actual structure itself, although such formulas may be applicable to a member of the broad genus. Thus, it would appear best to characterize the products referred to in the hereto appended claims, in terms of the method of manufacture of said products, rather than attempting to rely upon structural formulas, in view of what has been said.

An alkylene oxide may be added in the gaseous or liquid phase, to the melt of a substituted water-insoluble isocyclic hydroxyl compound, as defined above, at a temperature at which the alkylene oxide is absorbed by the hydroxyl compound, and which generally lies between 50° C. and 250° C. It is also possible to cause the substituted isocyclic hydroxyl compound to react with the selected alkylene oxide in a closed vessel, during which heating may be advantageous at the beginning of the reaction. In these reactions the length of the polyglycol ether chain is determined by the proportion of the alkylene oxide caused to react. In any event, the amount employed must be sufficient to produce water-solubility, but not of such proportion that surface activity is lost. This particular point will be discussed in detail subsequently. It is well known that various catalysts may be employed for the formation of the ethers and polyethers; and the particularly desirable catalysts include caustic alkalies, alkali alcoholates, tertiary non-hydroxylated organic bases, and the like; and furthermore, in some instances at least, acid compounds such as potassium bisulfate may be employed. It is also known, of course, that the halohydrins corresponding to the alkylene oxides may be used in place of the oxides themselves.

The previously formed glycol ether chains may also be combined with polycyclic hydroxyl compounds substituted in the manner indicated, but in any one of various methods, for instance the following procedure:

The substituted isocyclic hydroxyl compound in the form of its alkali compound (alcoholate or phenolate) is caused to react with a selected halohydrin so that one obtains a monoglycol ether of the substituted isocyclic hydroxyl compound. Such derivative is then transformed into the halogen alkyl ether, for instance, by treatment with thionyl chloride; and the halogen alkyl ether of the substituted isocyclic hydroxyl compound is caused to react with polymerized alkylene oxide, for instance, a polyglycol derived from ethylene oxide in the presence of caustic alkali.

As suggested previously, as far as the substituted radical is concerned, carbon-oxygen-carbon linkages may replace carbon-carbon linkages. As examples of substituted isocyclic hydroxyl compounds which may be used as starting materials for the emulsion-preventing agents contemplated by our invention, are the following: Normal butylphenols, isobutyl-ortho-cresols, di-isobutylphenols, isoamylcresols, isohexylxylenols, isooctyl-a-β-naphthols, isononylresorcinols, isododecylphenols, isododecylcyclohexanols, normal dodecylphenols, normal octadecylphenols, normal undecyl-para-hydroxyphenylketone of the formula $C_{11}H_{23}CO.C_6H_4OH$, iso-octylphenols, iso-octyl-ortho-chlorphenols, n-heptadecylparahydroxyphenylketone of the formula

$C_{17}H_{35}CO.C_6H_4OH$ ortho- and para-benzylphenol, cyclohexyl-ortho-cresols, para-oxydiphenyl, para-oxy-phenyl-camphenes, the corresponding condensation products of phenol or the cresols, with diterpenes and the like.

Likewise, one may employ various partially or totally hydrogenated derivatives of the above. Generally speaking, if the isocyclic nucleus contains only one nucleus substituent radical (excluding the hydroxyl radical), and if such substituent radical contains a tertiary alkyl radical, then it is desirable that such alkyl radical contain at least eight carbon atoms. In any event, however, the hydroxyl compound prior to etherization must be water-insoluble.

Besides the compounds mentioned, there may be used various other isocyclic hydroxyl compounds substituted, as stated above, which are obtained in the form of technical mixtures. The substituted isocyclic hydroxyl compounds may be prepared in various ways. For instance, olefinic compounds containing at least four carbon atoms may be caused to react in known manner with aromatic hydroxyl compounds. In this case there may be used definite olefines, for instance, isobutylene, di-isobutylene, normal dodecylene, cyclohexene, camphene or the like, or the olefine-mixtures obtained, for instance, by dehydrating the mixtures of primary alcohols having about 4 to 8 carbon atoms produced in the reduction of carbon monoxide by means of certain catalysts, or by catalytic polymerization by one of the known methods of low-molecular olefines, such as ethylene, propylene, isobutylene or the like, or of olefines obtained from the primary alcohols having about 4 to 8 carbon atoms produced in the reduction of carbon monoxide.

Substituted aromatic hydroxyl compounds, suitable for use in producing the emulsion-preventing agents contemplated by our invention, may also be obtained by the known condensation of aromatic hydroxyl compounds with alcohols containing at least four carbon atoms, for instance, tertiary butyl alcohol, alcohols having about 4 to 8 carbon atoms (which, as above mentioned, are produced in the catalytic reduction of carbon monoxide), cyclohexanol, methylcyclohexanols or others, including derivatives of hydrogenated naphthols.

Alkyl-substituted aromatic hydroxyl compounds may also be obtained from acyl-substituted aromatic hydroxyl compounds by reducing in known manner only the keto group.

The acylaromatic hydroxyl compounds which may be used as starting materials may be prepared by esterifying the appropriate carboxylic acids or their derivatives with the aromatic hydroxyl compounds, and then treating these esters with aluminum chloride, whereby they undergo molecular rearrangement to the corresponding ketones.

The hydroaromatic hydroxyl compounds substituted in the nucleus by at least one hydrocarbon radical, which may also be used as starting materials, may easily be obtained according to known methods, for instance, by the catalytic hydrogenation of the corresponding aromatic hydroxyl compounds in the presence of a hydrogenation catalyst.

As examples of alkylene oxides or equivalents which are brought into reaction with the substituted isocyclic hydroxyl-compounds, the following may be mentioned: ethylene oxide, 1:2-propylene oxide, 1:2- or 2:3-butylene oxide, butadiene dioxide, cyclohexene oxide, glycidol, epichlorhydrin, beta methyl glycidol, beta methyl epichlorhydrin, isobutylene oxide, or the like.

The glycol and polyglycol ethers of the type referred to are products of comparatively recent commercial development, in other words, having found application during the last decade. Many are produced in a form that is water-insoluble, or only shows a slight tendency towards water-solubility. In other words, the products so obtained are used as readily emulsifiable oils, and some will produce a more or less stable emulsion with water. Solubilities depend upon the alkylene oxide used and the length of the chain formed in relationship to the original water-insoluble parent material. It is to be noted, however, that the type employed for the present purpose is limited to the water-soluble surface-active type. Such types are readily available from the water-insoluble and partially water-soluble type by the introduction of a longer ether chain. Furthermore, it has been found possible to develop certain types of compounds which represent distinctly new species. For this reason, it would appear desirable to indicate the range of suitable material by reference to a number of examples.

Example 1

Iso-octylphenol is treated with approximately 8–10 moles of ethylene oxide (or a slightly additional amount if need be), so as to produce a water-soluble surface-active iso-octylphenyl polyglycol ether.

Example 2

Isododecylphenol or a closely allied homologue may be employed. Such materials can be obtained in various manners, for instance, by condensing phenol with a mixture of the polymerization products with propylene or propylene-containing gases, which consist mostly of unsaturated hydrocarbons having 12 carbon atoms. Similarly, one may treat phenol with isododecylchloride in the presence of aluminum chloride, or a catalyst of similar action. Such material, i. e., dodecylphenol, may be treated in the manner indicated in Example 1, or may be treated in the following manner:

To approximately 260 parts of the alkylated phenol (isododecylphenol) there is added one part of sodium methylate. Thereupon ethylene oxide is introduced at 140–160° C., until the increase in weight amounts to 570 parts. The isododecylchloride can be prepared in any manner, but is most suitably prepared by the monochlorination of the light oil fraction, consisting essentially of hydrocarbons having 12 carbon atoms.

Example 3

A kerosene fraction distilling between substantially 160° C. and 245° C. and consisting of paraffinic hydrocarbons, the major proportion of which is selected from the group consisting of decane, undecane, dodecane, and tridecane, is subjected to a monochlorination process. The alkyl chlorides so obtained are employed in the same manner as isododecylchloride was employed in the previous example, but in any event, sufficient oxide is employed to yield a water-soluble surface active product.

Example 4

250 parts of an alkylated cresol mixture, which is obtained by causing crude cresol (containing ortho-, meta- and paracresol) to react with the monochlorination products of a middle oil fraction boiling at 160–220° C. in the presence of a catalyst such as $AlCl_3$ or $ZnCl_2$, are treated with two parts of caustic soda solution of 40% strength and condensed with 600 parts of ethylene oxide.

Example 5

170 parts of isohexylphenol are mixed with 0.5 part of caustic alkali powder. The whole is heated to about 130–135° C. and the water formed is removed under reduced pressure, while stirring. Thereupon, ethylene oxide is introduced into the melt while well stirring, during which operation care must be taken that the temperature of the reaction mass is maintained between 180° C. and 200° C. When about 300 parts of ethylene oxide are taken up, the reaction is interrupted.

Example 6

358 parts of a compound of the formula:

wherein R stands for the acyl radical of oleic acid, are mixed with 3 parts of sodium ethylate and the mixture is heated in an iron pressure vessel with 300 parts of ethylene oxide to 90–100° C.; the temperature is maintained until the originally existing pressure has disappeared. Thereupon, this treatment is repeated using each time 300 parts of ethylene oxide until in all 1100 parts of ethylene oxide are absorbed.

Example 7

A product of similar action is obtained, by causing according to one of the methods described in the preceding examples, about 700 parts of ethylene oxide to act upon 276 parts of a compound of the formula $C_{11}H_{22}CO.C_6H_4.OH$ (undecyl-para-hydroxy-phenyl-ketone).

Example 8

150 parts of isobutylphenol are mixed with 15 parts of a solution of 10 percent strength of sodium methylate in methyl alcohol, the mixture is heated to 130° C.–140° C., and the methyl alcohol is removed under reduced pressure while stirring; thereupon, 260 parts of ethylene oxide are introduced at 150° C.–160° C., with the absorption of the oxide.

Example 9

600 parts of crude decylphenol (obtained by condensation of crude decyl chloride and phenol) are subjected with addition of 20 parts of caustic soda solution of 46° Bé. at 120–140° C. for about 15 hours to reaction with ethylene oxide gas until 1320 parts of ethylene oxide are absorbed.

Example 10

220 parts of isononylphenol, prepared by condensation of phenol with an olefine mixture obtained by the polymerization of propene and consisting essentially of isononylenes, are caused to react according to one of the above described methods with 350 parts of ethylene oxide, or such additional amount as will produce water solubility without loss of surface activity.

Example 11

290 parts of an alkylphenol (which is regarded as consisting mainly of tetradecylphenol, and is obtainable by first introducing three parts of boron fluoride into 280 parts of molten phenol, and then introducing at 25–30° C. 588 parts of an olefine having a boiling point of 212–217° C. and consisting mainly of the hydrocarbon $C_{14}H_{28}$, and subsequently stirring for about 2 hours at the same temperature) are mixed with 2.5 parts of caustic soda solution of 40° Bé. The whole is heated to 130° C. and 528 parts of ethylene oxide are then introduced.

Example 12

Into 288 parts of an alkylphenol, which is obtained by adding 940 parts of molten phenol to a solution of 67 parts of boron fluoride in 36 parts of water and then adding at 40–50° C. 1940 parts of an olefine having the boiling range of 180–220° C. and an average molecular weight of 194 and further stirring for two hours, there is introduced under the conditions described in Example 8 a mixture of 15 percent of 1:2-propylene oxide and 85 percent of ethylene oxide until the polyglycol ether formed is soluble in water. The product is a semi-solid mass.

The mixture of olefines used for the production of this polyglycol ether may be prepared by polymerizing olefines with 6 or 7 carbon atoms obtainable from the corresponding alcohols in the catalytic reduction of carbon monoxide.

Example 13

439 parts of an alkylnaphthol containing as a substituent a radical of about 21 carbon atoms, obtainable by condensing with naphthol a trimeric isoheptylene obtained by dehydrating and polymerizing the alcohols produced in the catalytic reduction of carbon monoxide, are mixed with one part of powdered caustic potash, and the mixture is heated under reduced pressure to a temperature of 130–150° C., in order to eliminate the water formed. Then 1100 parts of ethylene oxide are introduced at 140–160° C.

Example 14

206 parts of iso-octylphenol, prepared by condensing di-isobutylene with phenol in the presence of boron fluoride, are mixed with 0.7 part of powdered caustic soda and heated to 120–130° C. under reduced pressure until the product is anhydrous. 1:2-propylene oxide is then introduced at a temperature between 160–180° C. until 1810 parts have been absorbed.

Example 15

262 parts of isododecylphenol, prepared by condensing a propylene polymerization product containing chiefly isododecylene with phenol with the aid of a catalyst known for this purpose, are mixed with 2.5 parts of sodium methylate and heated to 150–160° C. 740 parts of glycidol are then slowly added drop by drop, while stirring.

Example 16

182 parts of p-cyclohexylcyclohexanol are mixed with 1.8 parts of caustic soda solution of 40° Bé. The mixture is heated to 140–160° C. and 1:2-propylene oxide is then introduced until 175 parts have been absorbed. A bright water-insoluble oil is obtained.

In order to render the product soluble in water, 356 parts of the oily polyether are converted into the alcoholate with the equivalent amount of sodium in xylene. The suspension of the alcoholate is then heated to boiling, while stirring, with 150 parts of sodium chloracetate. After removing the solvent there remains a solid product which contains the sodium salt of the cyclohexylcyclohexyltripropylene-glycol-hydroxy-acetic acid. The oil can also be solubilized by treatment with an additional amount of ethylene oxide.

Example 17

222 parts of isooctylresorcinol are caused to react, according to one of the above processes, with about 530 parts of ethylene oxide.

Example 18

262 parts of tri-isobutylphenol

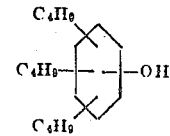

are treated with 420 parts of ethylene oxide according to one of the methods above described.

Example 19

180 parts of p-capropylphenol-(p-hydroxy-caprophenone)

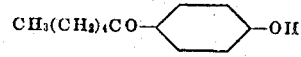

prepared by condensation of caproic acid chloride and phenol in the presence of $AlCl_3$, are dissolved in an alcoholic caustic potash solution containing the equivalent amount of caustic potash, and the whole is caused to react with 225 parts of ethylene oxide in the manner previously indicated.

Example 20

At the present time there is available a large number of aryl fatty acids used for various purposes, such as additive agents to lubricating oils. The method of producing the same is adaptable as such, or with obvious modification to hydroxy aryl fatty acid compounds. For instance, reference is made to Industrial & Engineering Chemistry, industrial edition, 1939, page 856. The procedure there employed may be used in connection with phenol, beta naphthol, cresol, amyl phenol, etc. Reference is also made to U. S. Patent No. 2,144,324, dated January 17, 1939, to Bowles and Kaplan. The procedure there employed may be used in connection with hydroxy benzyl chloride or the like.

Another procedure, and in some respects the simplest procedure, for the manufacture of hydroxy aryl fatty acids, is described in U. S. Patent No. 2,026,217, dated December 31, 1935, to De Groote and Keiser. In methods employing a Freidel-Crafts reaction, one is not limited to ordinary fatty acids, but may employ acids such as butyric acid, pentanoic acid, heptoic acid, octanoic acid, decanoic acid, and the like. Some of these acids, containing either straight or branched chains, are obtained by the oxidation of paraffin and are available in the open market. These acids are generally saturated, but the products derived by monochlorination can be reacted with phenolic bodies, or even with hydroxy hydroaromatic bodies by the Freidel-Crafts or similar reactions, to give suitable products for subsequent treatment with alkylene oxides, particularly ethylene oxide, in the manner previously indicated.

*Example 21*

1 mole of resorcinol is etherized with 1 mole of cetyl or octadecyl alcohol. The ether thus derived, i. e., the one obtained by means of octadecyl alcohol, is treated in the manner previously indicated with ethylene oxide to give a suitable water-soluble product.

*Example 22*

Butylated phenyl phenol is treated in the manner previously suggested with ethylene oxide to give a water-soluble product.

*Example 23*

Phenolic bodies of the kind described in U. S. Patent No. 2,086,216, dated July 6, 1937, to De Groote, are employed for treatment with an alkylene oxide, such as ethylene oxide. Such materials include hexadecyl phenol, palmityl phenol, cetyl phenol, ceryl phenol, and other phenolic derivatives of waxes having, in some instances, as many as 32 carbon atoms in the alkyl side chain, or in the acyl radical attached to the aromatic nucleus. It is to be noted that treatment with ethylene oxide need not be limited to any single compound; but if desired, a mixture of suitable hydroxy hydroaromatics or phenolic bodies may be treated. This applies not only to the present example, but to all the examples previously mentioned and the next succeeding example.

*Example 24*

Two moles of amyl phenol are reacted with one mole of acetone to produce bis-amylphenylol (2,2)propane. The above product is treated with approximately 15-20 moles of ethylene oxide in the manner previously indicated to give a water-soluble surface-active material.

*Example 25*

Various substituted phenols above described, particularly alkylated phenols, which are indicated as being suitable for reaction with an alkylene oxide, may first be subjected to partial or total hydrogenation, thus converting the products to the corresponding alicyclic compounds, i. e., derivatives of cyclohexane or the like; or such alicyclic derivatives may be obtained in any other suitable manner. Thus, the alicyclic compounds, which are in essence the analog of the aromatic compounds above described, both types being isocyclic in nature, may be treated in the same manner as the aromatic compounds, so as to produce equally suitable compounds.

It happens that there are known a few alicyclic derivatives, which are in essence analogs of substituted hydroaromatic alcohols, but instead of being derivatives of cyclohexanol, are derivatives of cyclobutanol and hydrocycloheptanol, as, for example, 2-octyl-cycloheptanol-1 and comparable alkylated cyclobutanols. Such materials are water-insoluble, and can be solubilized with ethylene oxide or the like, so as to result in surface-active material, which may be employed in the present process. For the sake of simplicity, it is understood in the hereto attached claims that the expression "hydroaromatic" is employed in its conventional meaning, whereas, the expression "cycloaliphatic" is employed in a restricted sense and is intended to include the adjacent cyclic bodies of the kind just mentioned, to wit, the derivatives of cyclobutanol and cycloheptanol as well as the hydroaromatic type. In some instances these compounds appear as minor constituents in naphthenyl alcohols derived by the reduction of esters, which, in turn, are derived from naphthenic acids which occur naturally in various crude oils.

Attention is directed to the fact that in certain instances an alkyl side chain may in essence be a modification in which there is an oxygen atom attached to a carbon atom as a derivative of a ketone; for example, as a reaction product derived from phenol and mono-chloropropyl ketone; and one may also note obvious instances in which the hydrocarbon chain is interrupted at least once by an oxygen atom. The introduction of a ketone residue, that is, a ketone radical derived hypothetically by the removal of a hydrogen atom, is in essence an acylalkyl radical, as is readily apparent from examination of its structure. More broadly, as when derived from an aromatic ketone, or an alicyclic or an aralkyl ketone, (when the hydrogen atom is removed from the alkyl portion) the radical may be considered as an acyl hydrocarbon radical. Sometimes such radicals are referred to as "ketonyl," compared with "acetonyl." However, an aromatic or hydroaromatic hydroxy compound having a long alkyl chain, even though such alkyl chain is interrupted at least once by an oxygen atom, is still perfectly satisfactory, provided that (a) such phenolic body or alcoholic body is water-insoluble prior to treatment with alkylene oxide; and (b) it becomes water-soluble upon treatment with an alkylene oxide or the equivalent. It should be noted that although the treatment with an alkylene oxide or its equivalent is necessary in all instances to produce water-solubility, yet excessive treatment should be avoided, in that the property of the compound may become extremely hydrophile. Generally speaking, it is safe to treat the water-insoluble product with ethylene oxide, so as to increase its weight not less than 125% and not more than 250%, or possibly 300% in some cases. Such procedure is generally a satisfactory guide; and if some other alkylene oxide is employed, for instance, propylene oxide, then of course an increased amount of alkylene oxide must be employed based on the increased molecular weight of propylene oxide and the like, and also based on the fact that its solubilizing effect per mole is somewhat less than that of ethylene oxide. If too great an amount of ethylene oxide is used, the resultant compound loses its surface activity. Generally speaking, 8-15 moles of the alkylene oxides or the equivalent per mole of isocyclic compounds, represent an upper limit.

Another convenient guide is that for each carbon atom present in the original water-insoluble material, one must add one-half molecular proportions of the alkylene oxide, if ethylene oxide is used, and possibly a greater amount, if an alkylene oxide of higher molecular weight is employed. An oxide, such as benzyl ethylene oxide, may be employed where the original raw material is almost on the verge of being water-soluble per se. It also must be remembered that the solubility of the product obtained varies somewhat with the method of manufacture and the particular catalyst which is present. It has previously been stated that this is one of the reasons that the exact composition of the compounds cannot be indicated as satisfactorily as might be desired in all instances. If solubility is not obtained with any other alkylene oxide, then ethylene oxide should be employed, because it appears to be best suited, for the reason that it reacts most readily, and because it promotes water solubility to a greater degree than other alkylene oxides or the equivalent. Glycidol, of course, or a similar type of compound, is just as satisfactory as ethylene oxide. In any event, water solubility can always be obtained, and the range of surface activity is such that there is no difficulty in stopping short of the point where surface activity would disapear, due to the presence of unusually excessive hydrophile properties. Oxygen atoms, if present in the parent material (in addition to the required hydroxyl radical or radicals) increase water solubility. If the product becomes water-soluble too easily (i. e., shows insufficient surface activity), repeat the procedure, but use an alkylene oxide, of higher molecular weight.

It may be well to emphasize what has been said previously in regard to surface activity of the water-soluble compound. If a dilution of the water-soluble reaction product of one part in 3,000 or 1 part in 5,000 or 10,000, no longer shows any decrease in the surface tension of the resulting solution, as compared with the raw water from which it was prepared, then one has obtained a water-soluble product from the parent water-insoluble product; but surface activity has been destroyed, due to the introduction of an extremely hydrophilic property. Needless to say, such product should be removed and the changes made in the introduction of the alkylene oxide along the lines previously indicated, so as to obtain a product, that is water-insoluble and also surface-active. In order that it be understood that such extremely hydrophilic compounds are not contemplated for use in the present process, it will be noted that the hereto appended claims are limited to the surface active type.

Another point which must be borne in mind is that the products, in addition to being water-soluble and surface-active, must be resistant to soluble alkaline earth salts, such as soluble calcium and magnesium salts. It sometimes happens that the compound obtained by treatment with the alkylene oxide is water-soluble and surface-active, but not resistant to calcium and magnesium salts, i. e., the alkaline earth salts. In such event the product must be treated further with a suitable alkylene oxide, or its equivalent, until one obtains resistance to alkaline earth salts. As a rule, there is no difficulty in obtaining this particular property.

It is possible that any residual hydroxyl radical present may be combined with an acid, for instance, a monobasic acid, or a polybasic acid, or even with a sulfonic acid; and such derivatives may be employed. In such instances it is to be noted that the carboxyl group or sulfonic group is not a functional group in the sense that it particularly adds or detracts from the solubility of the compound, but may yield the product which has some other desirable property. Usually, however, the introduction of an acyl radical will tend to increase the water solubility, but is apt to decrease the resistance to soluble calcium and magnesium salts, unless the acyl radical can also be subjected to similar etherization. Similarly, the hydroxyl radical may be removed, if desired, by an etherization process. Acyl groups, such as sulfonic groups, may be introduced directly into the cyclic nucleus. One reaction which may be employed is concerned with the use of a material, such as methyl sulfate or the like. Then again, the presence of a halogen atom or possibly a sulfonic group, would not be objectionable; but it is unnecessary and as a rule, means only possible increased complexity of reaction, and perhaps an undue added cost. If one desired, one might start with a chlorinated phenol; but in this instance also the chlorine atom or its equivalent is a nonfunctional constituent. All such conventional variants are well known.

For practical purposes our preference is to use ethylene oxide, rather than any other alkylene oxide, because it is cheaper, has lower molecular weight, and appears to be more reactive. It is also our preference to use isocyclic hydroxy compounds free from atoms or radicals of the kind which have just been described. It is also our preference to obtain water solubility, surface activity, and resistance to calcium and magnesium salts, by means of the alkylene oxide only, preferably ethylene oxide or glycidol, and not to obtain these properties by the introduction of some radical, such as a carboxyl radical or sulfonic acid radical.

Our preferred water-insoluble raw material is a monocyclic phenol, in which there is present at least one alkyl constituent containing at least 6 carbon atoms, and not more than 18 carbon atoms, such as octyl phenol or octadecyl phenol. It is understood, in view of what has been said, that a large class of the materials contemplated may be referred to as glycol, or preferably polyglycol ethers of water-insoluble substituted isocyclic hydroxyl compounds of the kind described, i. e., contain substituted isocyclic nuclei of the kind previously discussed and which are characterized by also containing the group

in which OX denotes a hydroxyl radical, an ether radical, or an ester radical, and $n$ denotes a whole number preferably above 3 and generally not over 40. Our preference is that OX denote a hydroxyl radical.

As is well known, the reaction with ethylene oxide or the like is not limited to a phenol or a cyclic alcohol of the kind herein described. Alkylene oxides may react with hydrogen atoms linked to oxygen, as in an ordinary high molecular weight aliphatic alcohol; or such oxides may react with a hydrogen atom linked to an amido or amino nitrogen atom. If such other reactive hydrogen atoms are present, then in that event, it is obvious that one may obtain a solubilizing effect, due in part, to the presence of such other reactive groups. For the sake of simplicity, it is to be noted that compounds so obtained, i. e., by virtue of the presence of such other radicals, are contemplated for the same purpose, i. e., preventing water-in-oil type emulsions resulting from acidization of calcareous oil-bearing structures, in our copending applications Serial Numbers 322,537, and 322,538, filed March 6, 1940.

More specifically, then, our preferred reagent is prepared by treating a monocyclic alkylated phenol having at least one alkyl group and not more than two alkyl groups containing not less than six carbon atoms and not more than 10 carbon atoms, with ethylene oxide, until an increase in weight of 150–200% has been obtained. A method of treatment is in the manner previously described. As a specific example of this preferred type, we prefer to treat octyl phenol, preferably having a normal octyl group, although a branched octyl group or a mixture may be employed, with ethylene oxide until one has obtained an increase in weight equivalent to approximately 125–175%. With the normal octyl phenol, our preference is to use ethylene oxide until an increase in weight is approximately 150%. In any event, the finished product must be soluble in presence of soluble calcium and magnesium salts; and if it is not soluble, a new batch must be prepared employing an increased amount of ethylene oxide, as previously indicated. Compare with Example 1 above.

All the chemical compounds previously described are water-soluble. For this reason they can be used without difficulty in aqueous solution as an emulsion-preventing agent by injecting such aqueous solution into the oil-bearing strata prior to acidization, or immediately after acidization. Such injection is made by conventional means, as for example, the same apparatus or mechanical device employed for injecting acid into the well or oil-bearing strata. Furthermore, substantially all the compounds above described are soluble in hydrochloric acid of a strength corresponding to approximately 15%. If, in any instance, any of the above compounds do not show solubility in approximately 15% hydrochloric acid, then if they are to be used in admixture with hydrochloric acid, as per our preferred procedure, they should be subjected to a further etherization treatment with an alkylene oxide, such as ethylene oxide, so as to increase the solubility in such hydrochloric acid solution. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22° Bé., corresponding to approximately 35.2% anhydrous acid. Some commercial hydrochloric acid is available in a strength which approximates the C. P. grade or slightly less than 37% anhydrous acid.

Similarly, if any of the compounds above selected are not soluble in half strength concentrated acid, such solubility can usually be obtained by further etherization of the kind just described.

Needless to say, our new composition of matter can be prepared readily in any convenient manner. The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 5%.

It is understood that in the hereto appended claims reference to an alkylene oxide broadly, or to a specific member as ethylene oxide, is intended to include obvious functional equivalents of the kind referred to, to wit, halohydrins, glycidol, epichlorhydrin, and the like. It is also understood that reference in the appended claims to substituted isocyclic compounds containing substituents of the kind described, may of course contain other substituent atoms or radicals, or may contain more than one of the required type of the substituent radical.

Having thus described our invention, what we claim as new and desire to secure by Letters Patent is:

1. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting an alkylene oxide with a member of the class consisting of water-insoluble substituted aromatic and hydroaromatic compounds containing at least one hydroxyl radical attached to a nuclear carbon atom, and at least one nuclear substituent selected from the class consisting of a hydrocarbon radical containing at least four carbon atoms, a ketonyl radical containing at least four carbon atoms; a substituted hydrocarbon radical containing at least four carbon atoms and interrupted at least once by an oxygen atom; an acyl radical containing at least four carbon atoms; and an oxyalkyl radical forming an ether linkage with a nuclear carbon atom, the alkyl part of such oxyalkyl radical containing at least four carbon atoms.

2. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting an alykylene oxide with a water-insoluble substituted phenol having at least one nuclear substituted alkyl radical containing at least four carbon atoms.

3. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting an alkylene oxide with a water-insoluble monocyclic phenol having at least one nuclear substituted alkyl radical containing at least six carbon atoms.

4. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting an alkylene oxide with a water-insoluble monocyclic phenol having at least one nuclear substituted alkyl radical containing at least six carbon atoms and not more than eighteen carbon atoms.

5. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting an alkylene oxide having at least two carbon atoms and not less than four carbon atoms, with a water-insoluble monocyclic phenol having at least one nuclear substituted alkyl radical containing at least six carbon atoms and not more than eighteen carbon atoms.

6. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting ethylene oxide with a water-insoluble monocyclic phenol having at least one nuclear substituted alkyl radical containing at least six carbon atoms and not more than eighteen carbon atoms.

7. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting ethylene oxide with a water-insoluble monocyclic phenol having at least one nuclear substituted alkyl radical containing at least six carbon atoms and not more than eighteen carbon atoms; and said ether being further characterized by the fact that the increase in weight obtained by reaction of ethylene oxide with the phenolic body is within the range of 80% to 150%, based on the original weight of the phenolic body.

8. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting ethylene oxide with a water-insoluble monocyclic phenol having at least one nuclear substituted alkyl radical containing at least six carbon atoms and not more than eight carbon atoms; and said ether being further characterized by the fact that the increase in weight obtained by reaction of ethylene oxide wih the phenolic body is within the range of 80% to 150%, based on the original weight of the phenolic body.

9. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting ethylene oxide with a water-insoluble monocyclic phenol having at least one nuclear substituted alkyl radical containing at least six carbon atoms and not more than eight carbon atoms; and said ether being further characterized by the fact that the increase in weight obtained by reaction of ethylene oxide with the phenolic body is within the range of 80% to 150%, based on the original weight of the phenolic body; said increase being obtained by the introduction of at least three and not more than six moles of ethylene oxide for each mole of phenolic raw material.

10. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether, which is derived by reacting ethylene oxide with octyl phenol so as to introduce at least three moles of ethylene oxide and not more than five moles of ethylene oxide for each mole of phenolic raw material employed.

11. A composition of matter, comprising strong mineral acid, and a water-soluble, surface-active, alkaline earth-resistant polyglycol ether, which is derived by reacting an alkylene oxide with a member of the class consisting of water-insoluble substituted aromatic and hydroaromatic compounds containing at least one hydroxyl radical attached to a nuclear carbon atom, and at least one nuclear substituent selected from the class consisting of a hydrocarbon radical containing at least four carbon atoms; a ketonyl radical containing at least four carbon atoms; a substituted hydrocarbon radical containing at least four carbon atoms and interrupted at least once by an oxygen atom; an acyl radical containing at least four carbon atoms; and an oxyalkyl radical forming an ether linkage with a nuclear carbon atom, the alkyl part of such oxyalkyl radical containing at least four carbon atoms.

12. A composition of matter, comprising hydrochloric acid whose concentration is at least equal to approximately half strength commercial 18° Bé. acid, and a water-soluble, surface-active, alkaline earth-resistant polyglycol ether, which is derived by reacting an alkylene oxide with a member of the class consisting of water-insoluble substituted aromatic and hydroaromatic compounds containing at least one hydroxyl radical attached to a nuclear carbon atom, and at least one nuclear substituent selected from the class consisting of a hydrocarbon radical containing at least four carbon atoms; a ketonyl radical containing at least four carbon atoms; a substituted hydrocarbon radical containing at least four carbon atoms and interrupted at least once by an oxygen atom; an acyl radical containing at least four carbon atoms; and an oxy-alkyl radical forming an ether linkage with a nuclear carbon atom, the alkyl part of such oxy-alkyl radical containing at least four carbon atoms.

13. A composition of matter, comprising hydrochloric acid whose concentration is at least equal to approximately half strength commercial 18° Bé. acid, and a water-soluble, surface-active, alkaline earth-resistant polyglycol ether, which is derived by reacting an alkylene oxide with a member of the class consisting of water-insoluble substituted aromatic and hydroaromatic compounds containing at least one hydroxyl radical attached to a nuclear carbon atom, and at least one nuclear substituted alkyl radical containing at least four carbon atoms.

14. A composition of matter, comprising hydrochloric acid whose concentration is at least equal to approximately half strength commercial 18° Bé. acid, and a water-soluble, surface-active, alkaline earth-resistant polyglycol ether, which is derived by reacting an alkylene oxide with a water-insoluble substituted phenol having at least one nuclear substituted alkyl radical containing at least four carbon atoms.

15. A composition of matter, comprising hydrochloric acid whose concentration is at least equal to approximately half strength commercial 18° Bé. acid, and a water-soluble, surface-active alkaline earth-resistant polyglycol ether, which is derived by reacting an alkylene oxide with a water-insoluble monocyclic phenol having at least one nuclear substituted alkyl radical containing at least six carbon atoms.

16. A composition of matter, comprising hydrochloric acid whose concentration is at least equal to approximately half strength commercial 18° Bé. acid, and a water-soluble, surface-active, alkaline earth-resistant polyglycol ether, which is derived by reacting an alkylene oxide with a water-insoluble monocyclic phenol having at least one nuclear substituted alkyl radical containing at least six carbon atoms and not more than eighteen carbon atoms.

17. A composition of matter, comprising hydrochloric acid whose concentration is at least equal to approximately half strength commercial 18° Bé. acid, and a water-soluble, surface-active, alkaline earth-resistant polyglycol ether, which is derived by reacting an alkylene oxide having at least two carbon atoms and not less than four carbon atoms, with a water-insoluble monocyclic phenol having at least one nuclear substituted alkyl radical containing at least six carbon atoms and not more than eighteen carbon atoms.

18. A composition of matter, comprising hydrochloric acid whose concentration is at least equal to approximately half strength commercial 18° Bé. acid, and a water-soluble, surface-active, alkaline earth-resistant polyglycol ether, which is derived by reacting ethylene oxide with a water-insoluble monocyclic phenol having at least one nuclear substituted alkyl radical containing at least six carbon atoms and not more than eighteen carbon atoms.

19. A composition of matter, comprising hydrochloric acid whose concentration is at least equal to approximately half strength commercial 18° Bé. acid, and a water-soluble, surface-active, alkaline earth-resistant polyglycol ether, which is derived by reacting ethylene oxide with a water-insoluble monocyclic phenol having at least one nuclear substituted alkyl radical containing at least six carbon atoms and not more than eighteen carbon atoms; and said ether being further characterized by the fact that the increase in weight obtained by reaction of ethylene oxide with the phenolic body is within the range of 80% to 150%, based on the original weight of the phenolic body.

20. A composition of matter, comprising hydrochloric acid whose concentration is at least equal to approximately half strength commercial 18° Bé. acid, and a water-soluble, surface active, alkaline earth-resistant polyglycol, ether, which is derived by reacting ethylene oxide with a water-insoluble monocyclic phenol having at least one nuclear substituted alkyl radical containing at least six carbon atoms and not more than eight carbon atoms; and said ether being further characterized by the fact that the increase in weight obtained by reaction of ethylene oxide with the phenolic body is within the range of 80% to 150%, based on the original weight of the phenolic body.

21. A composition of matter, comprising hydrochloric acid whose concentration is at least equal to approximately half strength commercial 18° Bé. acid, and a water-soluble, surface-active, alkaline earth-resistant polyglycol ether, which is derived by reacting ethylene oxide with a water-insoluble monocyclic phenol having at least one nuclear substituted alkyl radical containing at least six carbon atoms, and not more than eight carbon atoms; and said ether being further characterized by the fact that the increase in weight obtained by reaction of ethylene oxide with the phenolic body is within the range of 80% to 150%, based on the original weight of the phenolic body; said increase being obtained by the introduction of at least three and not more than six moles of ethylene oxide for each mole of phenolic raw material.

22. A composition of matter, comprising hydrochloric acid whose concentration is at least equal to approximately half strength commercial 18° Bé. acid, and a water-soluble, surface-active, alkaline earth-resistant polyglycol ether, which is derived by reacting ethylene oxide with octyl phenol so as to introduce at least three moles of ethylene oxide and not more than five moles of ethylene oxide for each mole of phenolic raw material employed.

MELVIN DE GROOTE.
BERNHARD KEISER.